(12) United States Patent
Wakamatsu et al.

(10) Patent No.: US 6,725,064 B1
(45) Date of Patent: Apr. 20, 2004

(54) PORTABLE TERMINAL DEVICE WITH POWER SAVING BACKLIGHT CONTROL

(75) Inventors: Kiichirou Wakamatsu, Anjo (JP); Tadao Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 499 days.

(21) Appl. No.: 09/615,262

(22) Filed: Jul. 13, 2000

(30) Foreign Application Priority Data

Jul. 13, 1999 (JP) .......................................... 11-199253
Apr. 7, 2000 (JP) ....................................... 2000-106997

(51) Int. Cl.⁷ ................................................ H04M 1/00
(52) U.S. Cl. ..................... 455/566; 455/414.1; 345/102
(58) Field of Search ............................... 455/566, 550, 455/575, 226.4, 90, 343, 414.1; 345/102, 168, 169, 170; 379/368, 433; 434/307 A, 359, 318; 84/610, 609

(56) References Cited

U.S. PATENT DOCUMENTS

| | | | | |
|---|---|---|---|---|
| 5,548,832 A | * | 8/1996 | Karam | 455/226.4 |
| 5,890,910 A | * | 4/1999 | Tsurumi et al. | 434/307 A |
| 5,894,298 A | * | 4/1999 | Hoeksma | 345/102 |
| 6,083,009 A | * | 7/2000 | Kim et al. | 434/307 A |
| 6,157,849 A | * | 12/2000 | Cho | 455/566 |
| 6,278,887 B1 | * | 8/2001 | Son et al. | 455/566 |
| 6,292,676 B1 | * | 9/2001 | Ozaki et al. | 455/566 |
| 6,328,570 B1 | * | 12/2001 | Ng | 434/307 A |
| 6,351,736 B1 | * | 2/2002 | Weisberg et al. | 705/14 |
| 6,426,736 B1 | * | 7/2002 | Ishihara | 345/102 |
| 6,545,208 B2 | * | 4/2003 | Hiratsuka | 84/476 |
| 6,606,506 B1 | * | 8/2003 | Jones | 455/566 |
| 6,628,963 B1 | * | 9/2003 | Chung | 700/94 |

FOREIGN PATENT DOCUMENTS

| JP | 11-154900 | | 6/1999 |
|---|---|---|---|
| JP | 411184483 | * | 7/1999 |

* cited by examiner

Primary Examiner—Charles Appiah
(74) Attorney, Agent, or Firm—Harness, Dickey & Pierce, PLC (57) ABSTRACT

A cellular phone has back light illumination for its display unit and a key unit, and is capable of receiving internet information, receiving karaoke songs, or receiving and sending electronic mails. In the case that the cellular phone is used for electronic mailing, it is checked whether the cellular phone is operated in a character/number input mode. If it is not in the input mode, only the display unit and a function key part of the key unit are illuminated. A ten key part of the key unit is illuminated only when it is to be manipulated to change display on the display unit. In the case of executing the internet function or the karaoke function, the illumination control for the display unit and the key unit is controlled in the similar manner.

7 Claims, 10 Drawing Sheets

PORTABLE TERMINAL DEVICE WITH POWER SAVING BACKLIGHT CONTROL

CROSS REFERENCE TO RELATED APPLICATION

This application relates to and incorporates herein by reference Japanese Patent Applications No. 11-199253 filed on Jul. 13, 1999 and 2000-106997 filed on Apr. 7, 2000.

BACKGROUND OF THE INVENTION

The present invention relates to a portable terminal device such as a cellular phone having illumination function for a key unit and a display unit.

Conventional cellular phones have respective key units and LCD display units on the front side. The key unit includes a plurality of keys for inputting numbers, characters, operation commands and the like. The display unit is for displaying various information in characters or in images. The key unit and the display unit also include backlights such as light-emitting diodes so that the key unit and the display unit may be illuminated in operation. The light emitting diodes are turned off after a predetermined time, e.g., 10 seconds, from the completion of operation of the key unit and the display unit thereby to save the energy of a built-in battery.

The cellular phone may have a character information display mode for displaying character information for electronic mails or bank account checking on its display unit. In this mode, the keys are operated frequently. If illumination control of the key unit and the display unit is effected simultaneously based on only the phone condition or the time lapse after completing phone operation, battery power consumption increases.

It is proposed in JP-A-11-154900 to enable manual predetermined setting of turning of f of either the display unit or the key unit. However, if turning off the key unit is set in advance, it becomes difficult to manipulate the keys in the darkness.

SUMMARY OF THE INVENTION

It is therefore an object of the present invention to provide a portable terminal device with illumination control which consumes less electric power.

According to the present invention, a portable terminal device such as a cellular phone comprises a key unit, a display unit, an illumination unit, and a light control circuit. The illumination unit first illuminates both the display unit and the key unit, but stops illuminating the key unit based on a display condition of the display unit to save power supplied by a built-in battery.

In an internet mode, the illumination of the key unit is stopped after a predetermined time, and the illumination of the display unit is maintained as long as the displayed information on the display unit is changing.

In a karaoke mode, the illumination of the key unit is stopped after a predetermined time, and the illumination of the display unit is maintained as long as music is produced, for instance, song words are displayed on the display unit.

In an electronic mail mode, the illumination of ten key part of the key unit is stopped when the terminal device is in a non-character/number input mode in a predetermined time, and illumination of the display unit and a function key part of the key unit is maintained in a character/number input mode in the predetermined time.

BACKGROUND OF THE INVENTION

Other features, objects and advantages of the present invention will become more apparent from the following detailed description made with reference to the accompanying drawings.

DETAILED DESCRIPTION OF THE PREFERRED EMBODIMENT

Figure 1:
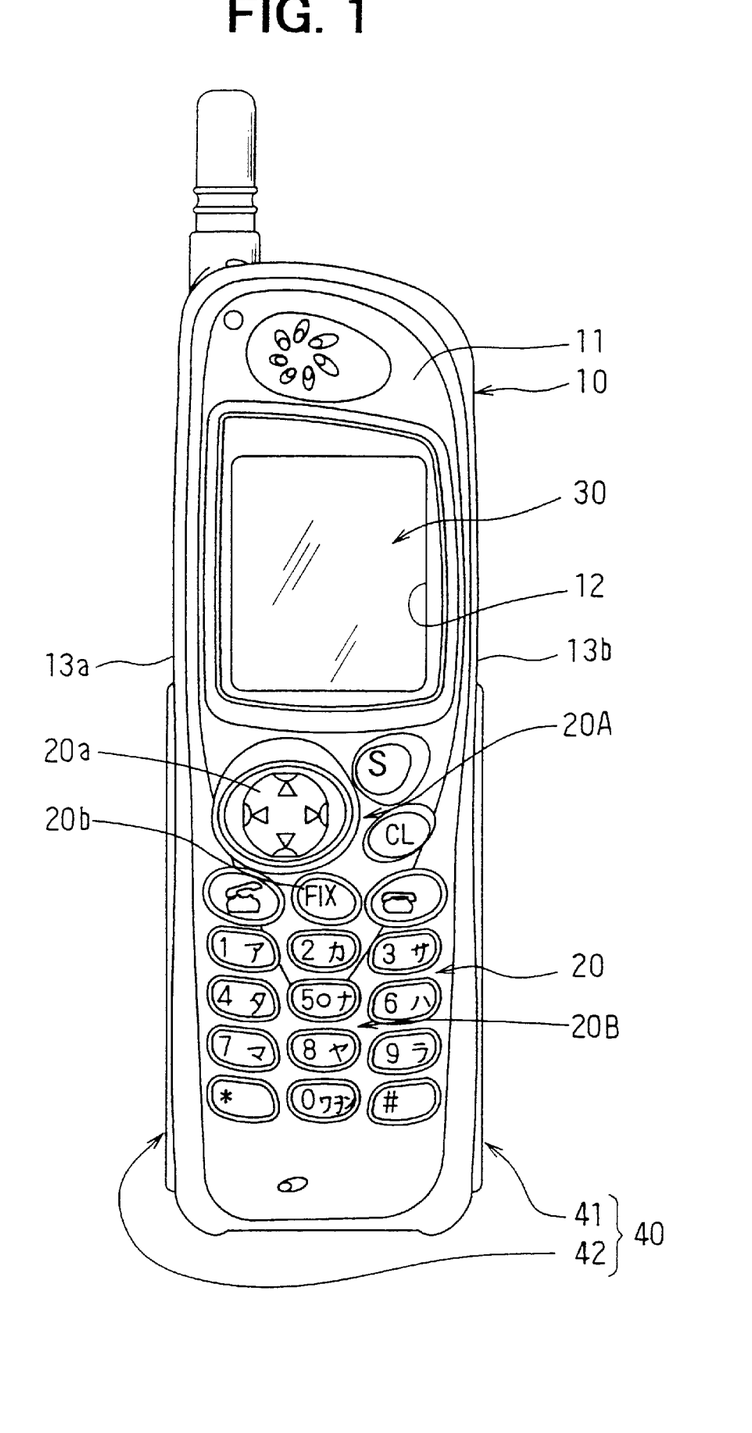
FIG. 1 is a front view of a cellular phone to which the present invention is applied.

Referring first to FIG. 1, a cellular phone as a portable terminal device comprises a casing 10, a key unit 20, display unit 30 and a touch sensor unit 40. The key unit 20 is provided on the front lower side of the casing 10, and includes function key part 20A and a ten key part 20B.

The function key part 20A includes an arrow key 20a, a FIX key 20b and the like, and the ten key part 20B includes number/character keys. The display unit 30 uses a liquid crystal display panel, and is fit in the opening 12 formed on the front upper side of the casing 10 to display various information. The touch sensor unit 40 includes a pair of touch sensors 41 and 42 provided at the left and right lower sides 13a and 13b of the casing 10. The touch sensor unit 40 detects user's manipulation operation of the cellular phone, when both sensors 41 and 42 are manipulated.

Figure 2:
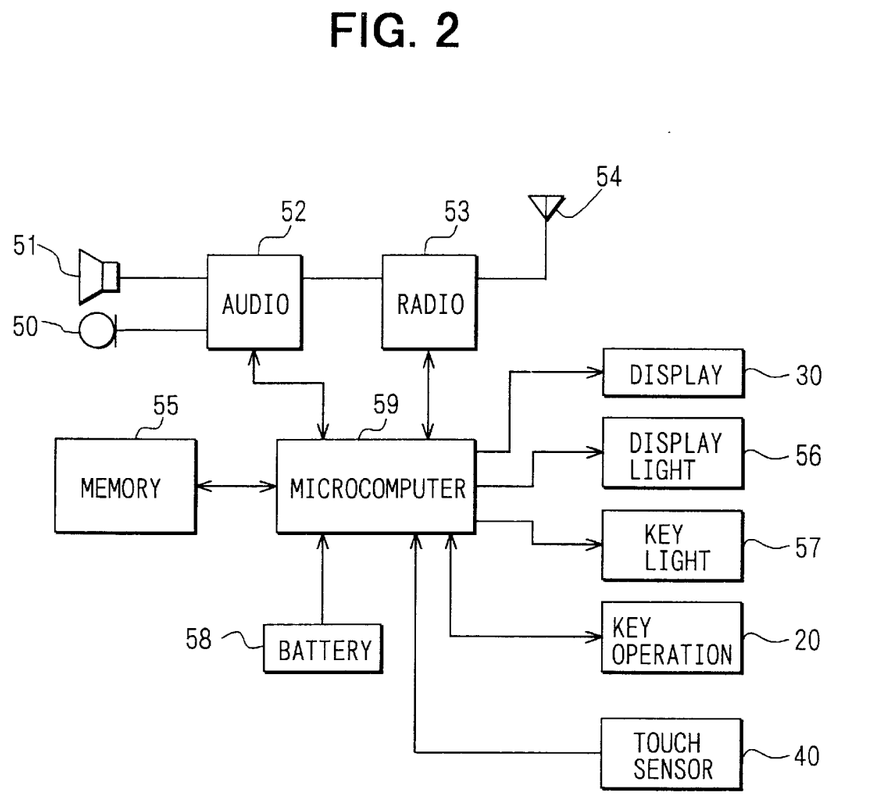
FIG. 2 is a block diagram showing an electronic circuit unit construction of the cellular phone shown in FIG. 1.

The cellular phone also comprises an electronic circuit unit shown in FIG. 2. The electronic circuit unit includes a microphone 50, a speaker 51, an audio circuit 52, a radio signal processing circuit 53, an antenna 54, a memory unit 55, a display light control circuit 56, a key light control circuit 57, a secondary battery 58, and a microcomputer 59.

The microphone 50 converts the phone user's input voice sounds to audio signals and applies the audio signals to the audio circuit 52 which is controlled by the microcomputer 52. The audio circuit 52 responsively produces transmission signals, and the radio signal circuit 53 which is also controlled by the microcomputer 59 modulates the transmission signals. Thus, the modulated signals are transmitted from the antenna 54 to a base station (not shown).

The radio signal circuit 53 in turn receives modulated signals from the base station through the antenna 54, and applies demodulated signals to the audio circuit 52. The speaker 51 responsively produces output voice sounds in response to the demodulated signals from the audio circuit 52.

The display light control circuit 56 controlled by the microcomputer 59 drives a plurality of light emitting diodes (for instance, light emitting diodes 7a and 7b in FIG. 7) provided as a back light exclusive to the display unit 30. The key light control circuit 57 controlled by the microcomputer 59 drives a plurality of light emitting diodes (for instance, light emitting diodes 7c to 7f in FIG. 7) provided as a back light exclusive to the key unit 20.

The secondary battery 58 supplies an electric power to the above circuits. The microcomputer 59 executes various processing such as a call transmitting and receiving processing, internet processing, karaoke processing, illumination control processing, and the like in the following manner based on a program and data stored in the memory unit 55.

First Embodiment

Figure 3:
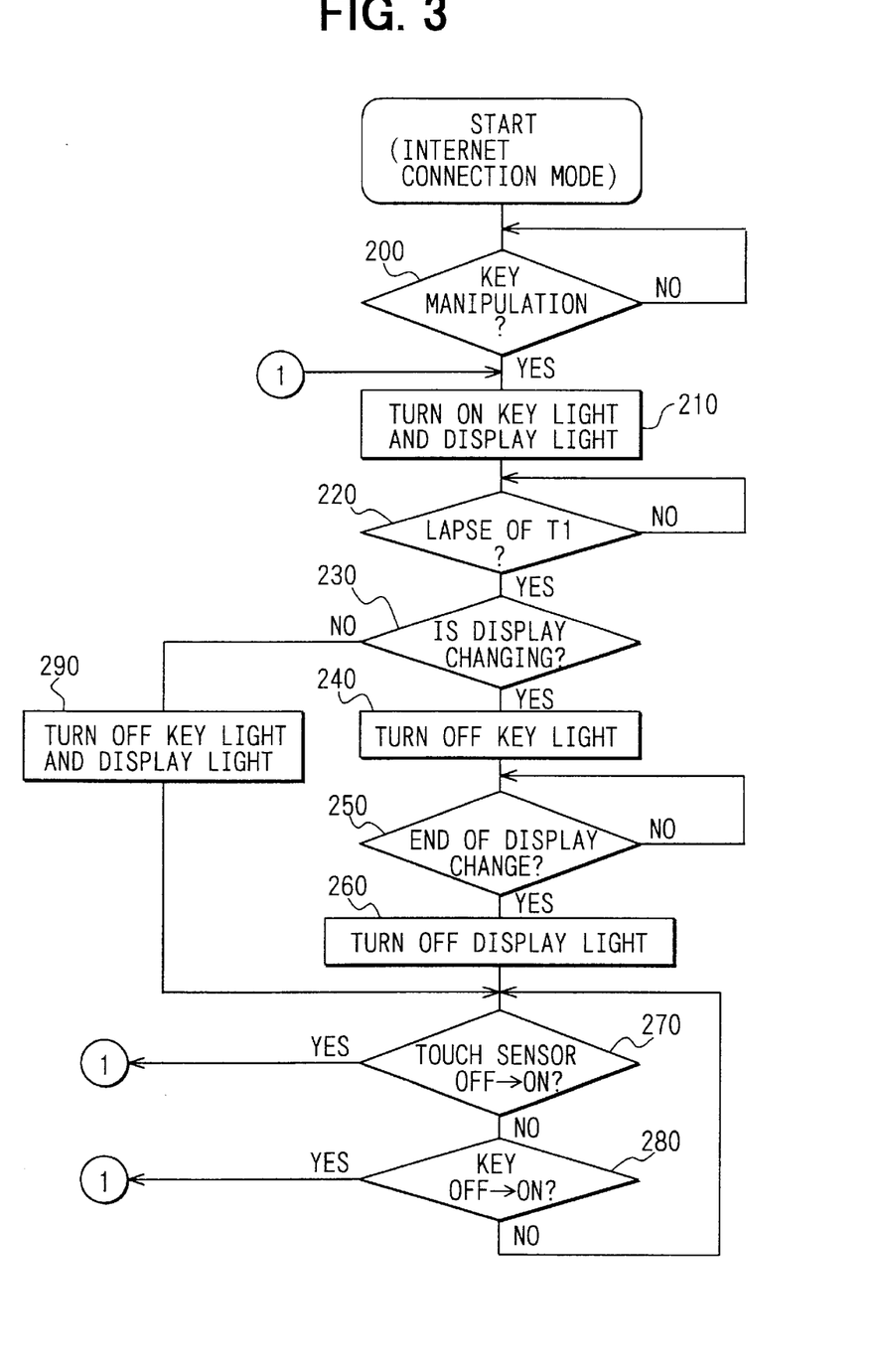
FIG. 3 is a flow diagram showing illumination control processing executed in the case of internet connection mode in a first embodiment of the present invention.

In a first embodiment, the microcomputer 59 is programmed to execute the illumination control processing as shown in FIG. 3. This processing is executed every predetermined time as an interrupt routine in the course of execution of the internet processing.

The microcomputer 59 first checks at step 200 whether the key unit 20 is manipulated. If the key unit 20 is manipulated (YES at step 200), the microcomputer 59 drives the display light control circuit 56 and the key light control circuit 57 at step 210. Thus, both the display unit 30 and the key unit 20 are illuminated.

The microcomputer 59 checks at step 220 whether a predetermined time T1 has lapsed from the start of illuminating the display unit 30 and the key unit 20. If the predetermined time T1 has lapsed (YES at step 220), the microcomputer 59 checks whether the display on the display unit 30 is changing. The microcomputer 59 determines the display change, if a display change flag stored in the memory unit 55 is in the set condition. If the display is changing (YES at step 230) after the manipulation of the key unit 20, the microcomputer 59 instructs the key light control circuit 57 to turn off the illumination of the key unit 20 at step 240 thereby saving the electric power of the secondary battery 58. However, the illumination of the display unit 30 by the display light control circuit 57 is continued, because the display is changing.

The microcomputer 59 checks at step 250 whether the display change ceased. If the display change ceased, that is, the display change flag in the memory unit 55 is in the reset condition (YES at step 250), the microcomputer 59 instructs the display light control circuit 56 to turn off the illumination of the display unit 30 at step 260. The illumination of the display unit 30 may be turned off after a predetermined time T2.

If no display change occurs (NO at step 230), on the other hand, the microcomputer 59 instructs both the display light control circuit 56 and the key light control circuit 57 to turn off both illumination of the key unit 20 and the display unit 30 at step 290.

The microcomputer 59 then checks at step 270 whether the touch sensor unit 40 is manipulated. If the touch sensor output changes from OFF to ON indicating the manipulation of the touch sensor unit 40 (YES at step 270), the microprocessor 59 repeats the above processing again from step 210 so that the key unit 20 and the display unit 30 are both illumination again.

If the touch sensor unit 40 is not manipulated (NO at step 270), the microcomputer 59 further checks at step 280 whether the key unit 20 is manipulated. If the key unit output changes from OFF to ON indicating the manipulation of the key unit 20 (YES at step 280), the microcomputer 59 repeats the above processing from step 210 so that the key unit and the display unit 30 are illuminated again. If neither the touch sensor unit 40 nor the key unit 20 is manipulated (NO at steps 270 and 280), the illumination for both the key unit 20 and the display unit 30 is maintained turned off.

The illumination light control for the key unit 20 and the display unit 30 performed by the above processing (FIG. 3) is shown in FIGS. 4A to 4D with respect to the case in which news information is browsed through the internet by downloading internet information and displaying news menu.

Figure 4A:
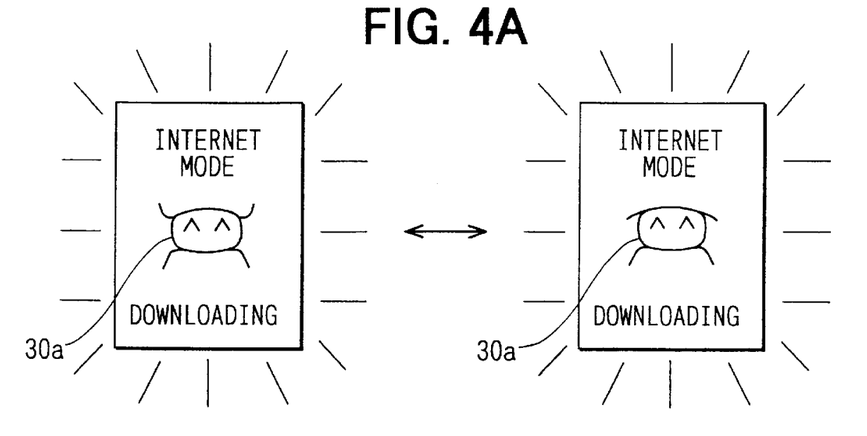
FIGS. 4A to 4D are schematic views showing displays of the cellular phone in the first embodiment.

When the key unit 20 is manipulated in the predetermined manner, the cellular phone starts receiving news data from a server side (base station) through the internet. The display unit 30 alternately displays two information as shown in FIG. 4A, while the news data are being received. In this instance, both the key unit 20 and the display unit 30 are illuminated, and a cartoon character image 30a displayed in the middle of the display unit 30 changes. The program for changing the cartoon character image 30a as shown in FIG. 4A is stored in the memory unit 55 as a part of internet function processing.

Figure 4B:
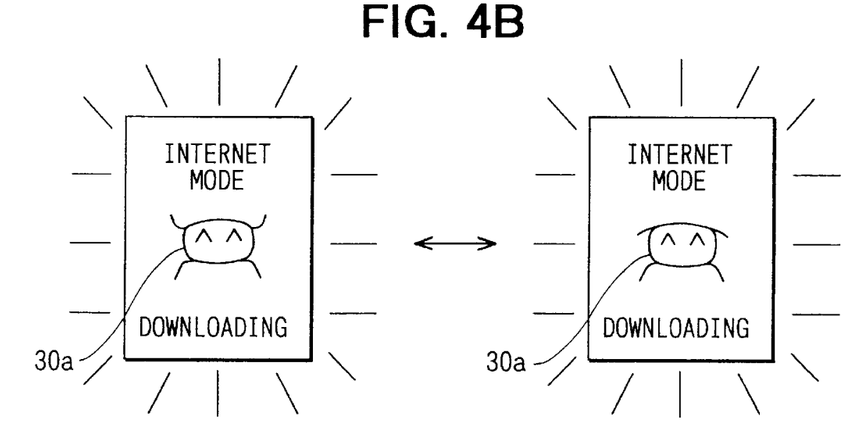

If the news data are still being received at the time of a lapse of the predetermined time T1, the cartoon character image 30a continues to change alternately with the illumination of the display unit 30 being maintained as shown in FIG. 4B. However, the illumination of the key unit 20 is turned off in this instance.

Figure 4C:
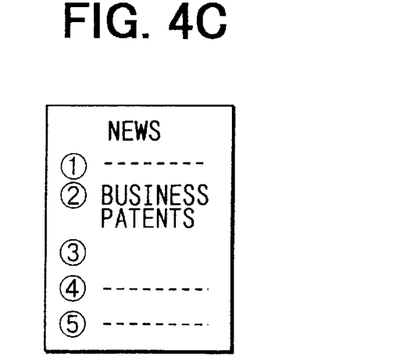
Figure 4D:
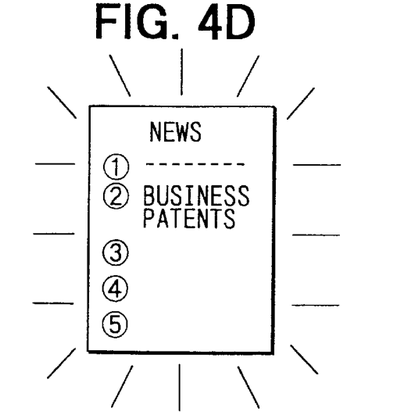

When receiving the news data is completed, the change of the cartoon character image 30a is stopped and the display change flag is reset. The illumination of the display unit 30 is turned off after the predetermined time T2. The display unit 30 displays the menu of the news as shown in FIG. 4C. If the touch sensor unit 40 is manipulated, both the key unit 20 and the display unit 30 are illuminated again as shown in FIG. 4D.

In the above operation, the key unit 20 need not be manipulated as long as the news data is being received for browsing internet news. The key unit 20 and the display unit 30 are continued to be illuminated for the predetermined time T1 from starting receiving the news data. However, the illumination of the key unit 20 is turned off, while the illumination of the display unit 30 is maintained until the display change stops. Thus, the electric power consumption can be reduced by turning off the illumination for the key unit 20 at an earliest possible time.

The power saving is very advantageous particularly when the information receiving operation continues for a long time without requiring manipulation of the key unit 20. Further, it is advantageous particularly when the display unit 30 uses a color liquid crystal panel, because the color liquid crystal panel consumes more power. The electric power consumption is reduced further, because the illumination of the display unit 30 is also turned off when the predetermined time T2 lapses after completing receiving the information.

In addition to the advantage of power saving, the illumination of the key unit 20 and the display unit 30 is restored by manipulation of the touch sensor unit 40 or the key unit 20 even after the illumination of the key unit 20 and the display unit 30 is turned off, so that the cellular phone can be manipulated with ease even in the darkness.

The first embodiment may be so modified that the illumination of both the key unit 20 and the display unit 30 is turned off after the internet information has completely been received. In this instance, the display on the display unit 30, for instance, character images or pictures, may be changed after the completion of the information and turning off the illumination may be triggered by monitoring changes of the display.

The display change may be effected not only for the internet information but also for other display information so that the illumination control may be effected by monitoring the changes. The illumination of the key unit 20 may be turned off in the course of receiving information (downloading) without maintaining the illumination of the key unit 20 for the predetermined time T1.

Second Embodiment

Figure 5:
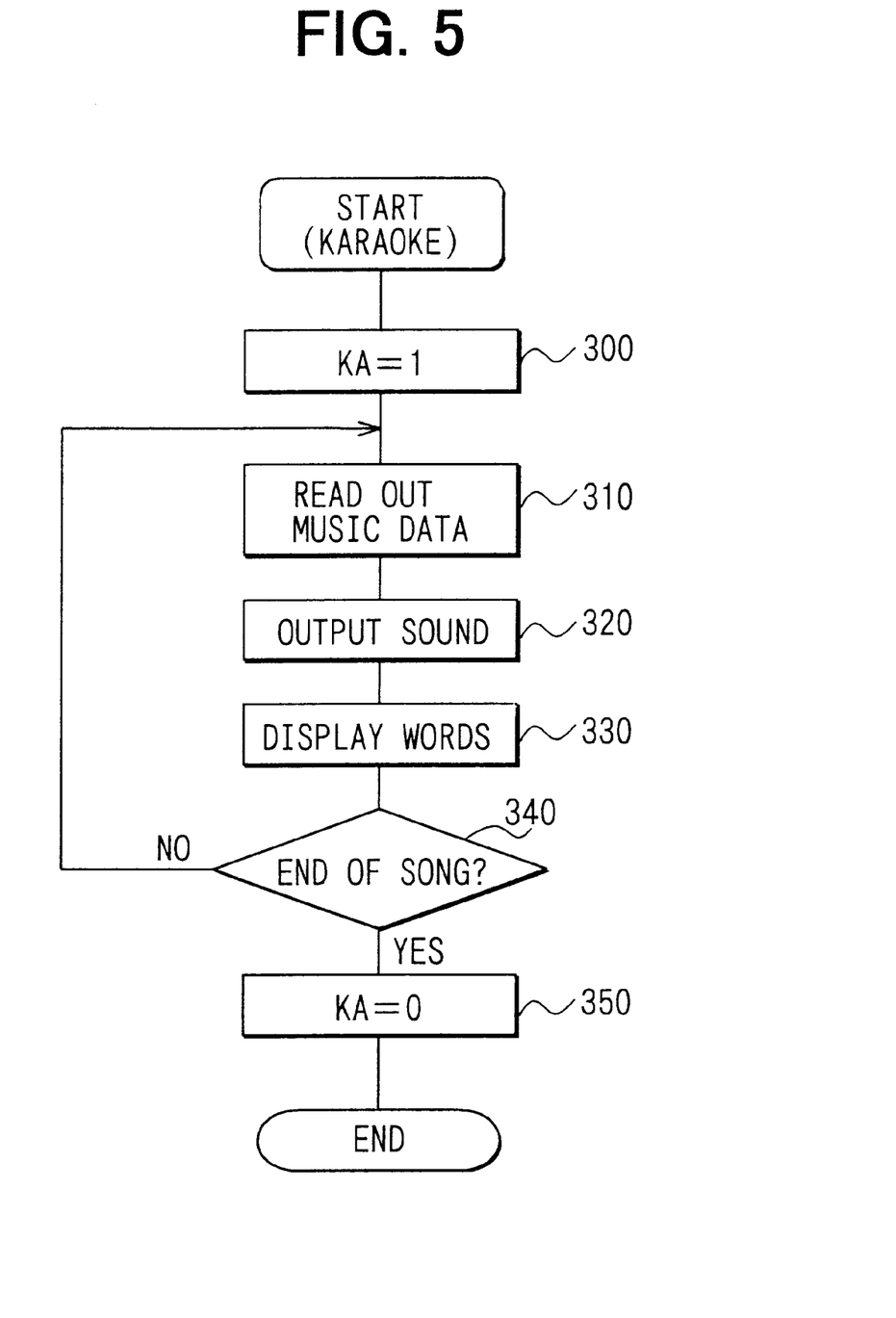
FIG. 5 is a flow diagram showing karaoke processing executed by the cellular phone in a second embodiment of the present invention.

In a second embodiment, the illumination control is effected in the course of karaoke processing which is shown in FIG. 5. In the second embodiment, the memory unit 55 stores a flag KA indicative of karaoke function. Further, the memory unit 55 stores music data which includes both orchestral sound data and song words data. The music data may be received through the internet.

The microcomputer 59 executes the karaoke processing when the key unit 20 is manipulated in the predetermined manner to select and receive the music data. The microcomputer 59 first sets the karaoke flag KA (KA=1) at step 300, and reads out the karaoke sound data from the memory unit 55 at step 310. The microcomputer 59 drives the audio circuit 52 based on the sound data so that the orchestral sound may be output from the speaker 51 at step 320. The microcomputer 59 also drives the display unit 30 based on the words data so that the display unit 30 displays the song words in timed relation with the sound output at step 330. In the karaoke processing, the phone user's singing voice may be detected by the microphone 50 and produced from the speaker 51 together with the orchestral sound.

The microcomputer 59 checks at step 340 whether the karaoke song has ended. If the song is still produced (NO at step 340), the microcomputer 59 executes the above processing from step 310. If the song has ended (YES at step 340), the microcomputer 59 resets the karaoke flag KA (KA=0) at step 350, thus completing the karaoke processing.

Figure 6:
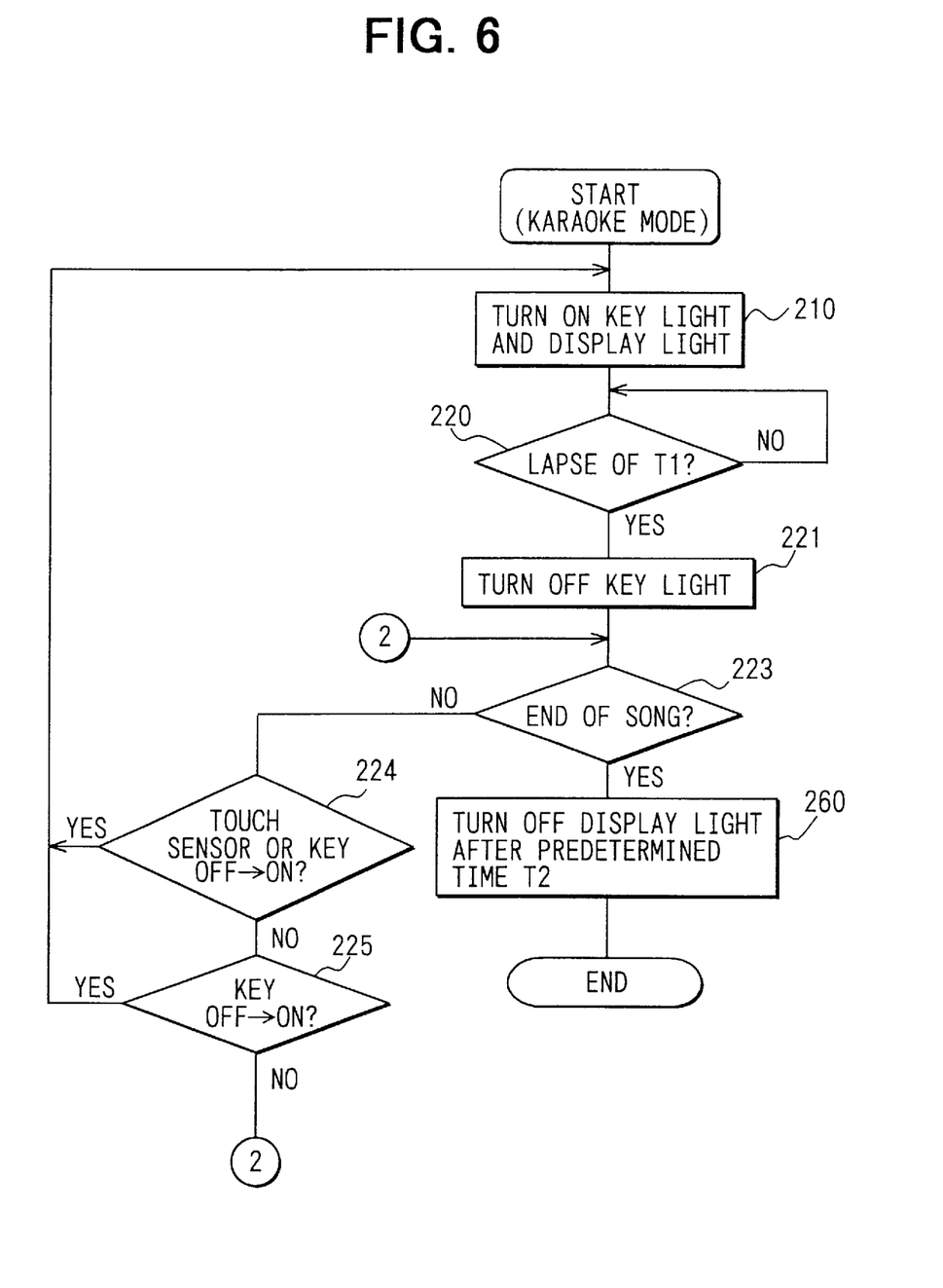
FIG. 6 is a flow diagram showing an illumination control mode in the case of karaoke mode in the second embodiment.

In the second embodiment, the illumination control is executed as shown in FIG. 6 in place of the processing of the first embodiment shown in FIG. 3. In FIG. 6, steps 210, 220 and 260 are the same as steps 210, 220 and 260 of FIG. 3. This processing is executed every predetermined time as an interrupt to the karaoke processing.

The microcomputer 59 starts illuminating the display unit 30 and the key unit 20 at step 210 by the display light control circuit 56 and the key light control circuit 57, respectively. The microcomputer 59 checks at step 220 whether the predetermined time T1 has lapsed from starting the illumination. If the predetermined time has lapsed (YES at step 220), the microcomputer 59 instructs the key light control circuit 57 to turn off the illumination of the key unit 20 at step 221, while still maintaining the illumination of the display unit 30. This turning off may be effected after a predetermined time from a display of the song words on the display unit 30.

The microcomputer 59 then checks at step 223 whether it is the end of the song with reference to the karaoke flag KA stored in the memory unit 55. If the flag KA is in the set condition indicating that the orchestral sound is still being produced (NO at step 223), the microcomputer 59 executes steps 224 and 225 to check whether the touch sensor 224 or key unit 20 is manipulated, respectively, so that the illumination of the key unit 20 and the display unit 30 may be controlled in the same manner as at steps 270 and 280 in the first embodiment shown in FIG. 3. However, if the flag KA is in the reset condition indicating the end of the song (YES at step 260), the microcomputer 59 instructs the display light control circuit 56 to turn off the illumination of the display unit 30 at step 260. The illumination of the display unit 30 is turned off after the predetermined time T2 as in the first embodiment.

In the second embodiment, the display unit 30 may be illuminated in timed relation with the display of the song words in place of the above timed relation with the production of the orchestral sound.

According to the second embodiment, the illumination of the key unit 20 is limited to the predetermined time T1 while the illumination of the display unit 30 is maintained as long as the song words are displayed on the display unit 30. Thus, the power for illuminating the key unit 20 is saved while ensuring visibility of the song words on the display unit 30.

Third Embodiment

Figure 7:
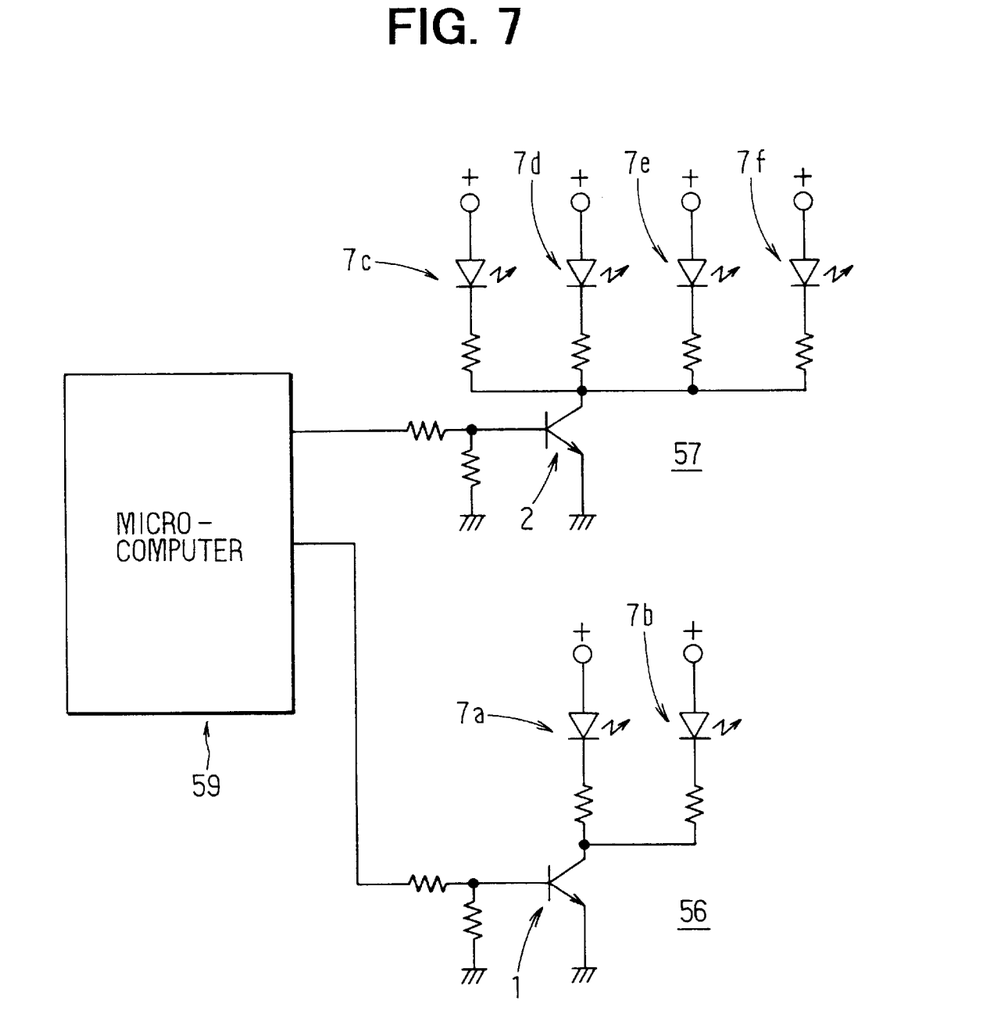
FIG. 7 is an electric wiring diagram showing a part of the electronic circuit unit according to a third embodiment of the present invention.

In a third embodiment, a pair of light emitting diodes 7a and 7b are provided between the display unit 30 and an uppermost key part (function key part 20A including the arrow key 20a and the FIX key 20b) of the key unit 20 to illuminate both the display unit 30 and the function key part 20A of the key unit 20. The diodes 7a and 7b are connected in parallel between a power supply and a transistor 1 which is controlled by the microcomputer 59. The transistor 1 operates as the display light control circuit 56.

Another set of light emitting diodes 7c to 7f are provided in the middle and lowermost part (ten key part 20B including ten (0 to 9) keys) of the key unit 20 to illuminate the ten key part 20B. The diodes 7c to 7f are connected in parallel between the power supply and a transistor 2 which is controlled by the microcomputer 59. The transistor 2 operates as the key light control circuit 57.

Figure 8:
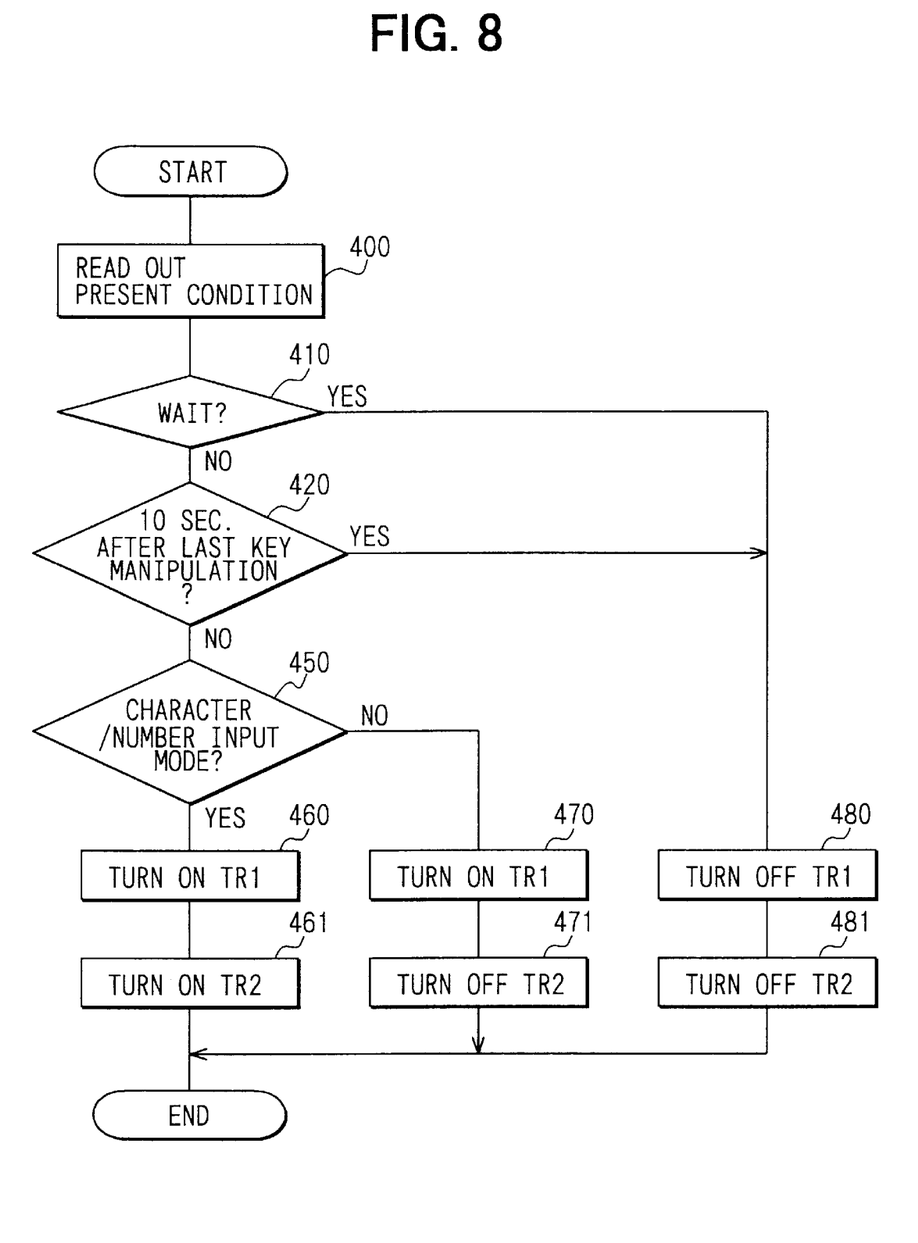
FIG. 8 is a flow diagram showing illumination control processing executed in the third embodiment.

The microcomputer 59 executes the illumination control processing shown in FIG. 8 every predetermined time (less than 10 seconds) as an interrupt in the course of other processing such as electronic mailing.

Referring to FIG. 8, the microcomputer 59 reads out the present condition of the cellular phone from the memory unit 55 at step 400, and checks at step 410 whether it is in the wait condition with reference to the stored present condition. If the cellular phone is not in the wait condition (NO at step 410), the microcomputer 59 checks at step 420 whether a predetermined time T0 (for instance, 10 seconds) has lapsed from the last manipulation of the keys.

If the lapsed time is less than the predetermined time T0 (NO at step 420), the microcomputer 59 checks at step 450 whether it is in the character/number input mode. This check may be made with reference to a character/number input flag stored in the memory unit 55.

If the input flag is set indicating the character/number input mode (YES at step 450), the microcomputer 59 turns on the transistors 1 and 2 at steps 460 and 461 to illuminate the display unit 30 and the key unit 20 by the light emitting diodes 7a to 7f, respectively. If the input flag is reset (NO at step 450), the microcomputer 59 turns on the transistor 1 at step 470 to illuminate mostly the display unit 30 and the function key part 20A of the key unit 20 by the light emitting diodes 7a and 7b. However, it turns off the transistor 2 at step 471 so that the ten key part 20B of the key unit 20 is not illuminated by the light emitting diodes 7c to 7f.

Further, if the cellular phone is in the wait condition (YES at step 410) or the predetermined time T0 has lapsed after the last key manipulation (YES at step 420), the microcomputer 59 turns off both transistors 1 and 2 so that the display unit 30 and the key unit 20 are not illuminated.

An exemplary operation of the third embodiment is shown in FIGS. 9A to 9G. In this instance, the display at the time of the electronic mailing is shown as a character information mode.

Figure 9A:
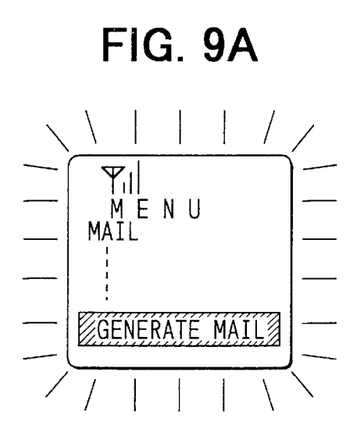
FIGS. 9A to 9G are schematic views showing displays at the time of an electronic mailing mode in the third embodiment.

When the FIX key 20b of the function key part 20B in the key unit 20 is manipulated, the display unit 30 displays a menu screen as shown in FIG. 9A as a part of the character information mode. In this instance, the character input flag in the memory unit 55 is in the reset condition. As a result, the display unit 30 and the function key part 20A of the key unit 20 are illuminated by the light emitting diodes 7a and 7b, while the ten key part 20B of the key unit 20 is not illuminated.

Figure 9B:
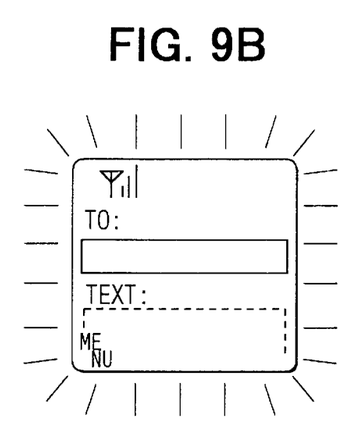

After inverting the display contrast of "GENERATE MAIL" on the display unit 30 by manipulating the arrow key 20a (for instance, 7), the FIX key 20b is manipulated to select "GENERATE MAIL", that is, electronic mail transmission mode, of the displayed menu. Then the arrow key 20a is manipulated again to scroll the display screen so that mail address position selection screen appears on the display unit 30. When the FIX key 20b is manipulated again, the mail address input screen is fixedly displayed on the display unit 30 as shown in FIG. 9B so that character/number input mode is executed. At this time, the character input flag is set in the memory unit 55, and the ten key part 20B is also illuminated by the light emitting diodes 7c to 7f.

Figure 9C:
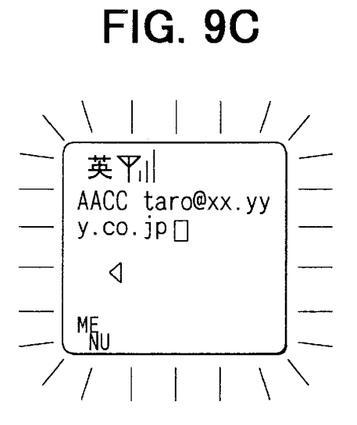

When the ten keys are manipulated to input the mail address as shown in FIG. 9C, the display unit 30 displays the input address. When the FIX key 20b is then manipulated, the character input flag in the memory unit 55 is reset so that the illumination for the ten key part 20B is stopped.

Figure 9D:
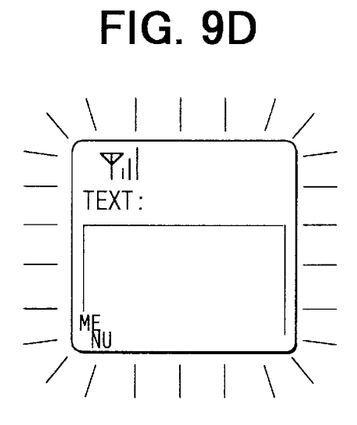

Then, after manipulating the FIX key 20b, the arrow key 20b is manipulated to further scroll the display screen so that a mail message text input selection screen appears on the display unit 30. If the FIX key 20b is manipulated, the mail message text input screen is fixedly displayed as shown in FIG. 9D so that the mail message (character/number) input mode is executed. At this time, the character input flag is set in the memory unit 55, and the ten key part 20B is also illuminated again.

Figure 9E:
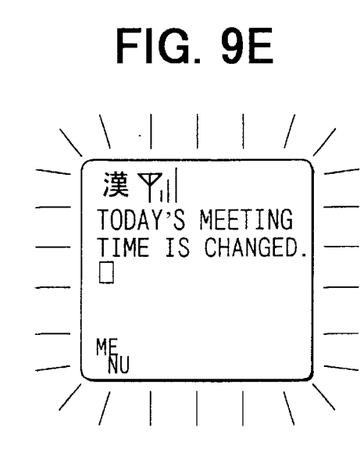
Figure 9F:
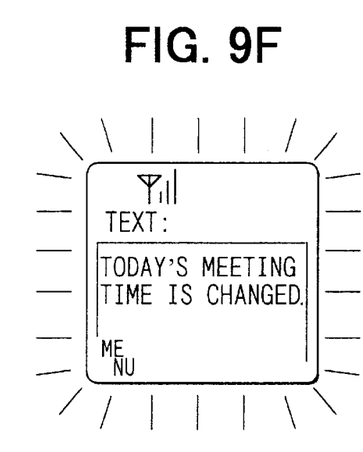

As the mail message is input by manipulation of the ten key part 20B, the display unit 30 displays the input mail message as shown in FIG. 9E. If the FIX key 20b is manipulated after the message input, the input mail is fixed as shown in FIG. 9F and the character input flag in the memory unit 55 is reset. Thus, the illumination for the ten key part 20B is stopped.

Figure 9G:
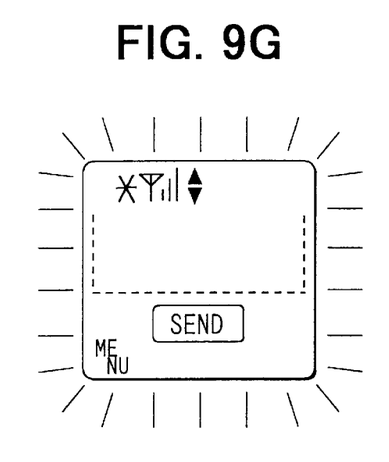

Then, the arrow key 20a is manipulated again to scroll the display screen so that a mail transmission (SEND) screen appears on the display unit 30. When the FIX key 20b is manipulated again, the mail is transmitted or sent out, and the display unit 30 displays SEND screen as shown in FIG. 9G. Thus, the electronic mailing processing ends. The illumination of the display unit 30 and the function key part 20A is finally stopped after 10 seconds from the last manipulation of the FIX key 20b.

According to the third embodiment, the ten key part 20B is illuminated only in the character/number input mode is executed, while the display unit 30 and the function key part 20A are illuminated continuously as long as the display unit 30 is displaying information. Thus, the electric power of the secondary battery 58 is saved.

The present invention should not be limited to the above embodiments, but may be implemented in many other ways. For instance, the portable terminal device may be a personal handy phone (PHS) or portable computer. The display unit may be a color liquid crystal display or other than a liquid crystal panel as long as illumination therefor is required.

What is claimed is:

1. A portable terminal device having music producing function, comprising:

a key unit having a plurality of keys thereon;

a display unit for displaying information in response to manipulation of the key unit;

an illumination unit including lighting means for illuminating the key unit and the display unit, the lighting means being separate from the display unit;

a battery for supplying the lighting means of the illumination unit with electric power;

display control means for controlling the display unit to display words of music as the information in response to output of the music during an execution of the music producing function;

end detection means for detecting an end of the music; and light control means for controlling the lighting means of the illumination unit in a predetermined mode, so that the lighting means of the illumination unit illuminates an entire area of the display unit, continuously during a period in which the music is produced and stops illuminating the display unit by the illuminating means when the end detection means detects the end of the music.

2. A portable terminal device as in claim 1, further comprising:

check means for checking whether the key unit and the display unit are continuously illuminated by the illumination unit for a predetermined time;

the light control means controlling the illumination unit in another predetermined mode thereby to stop illuminating the key unit in response to a positive check result of the check means;

music check means for checking whether the music is stopped after the second predetermined mode of the illumination unit; and the light control means controlling the illumination unit to stop illuminating the display unit in response to a positive check result of the music check means.

3. A portable terminal device as in claim 2, further comprising:

a touch sensor;

manipulation check means for checking whether the touch sensor is manipulated during a negative check result of the music check means, wherein the light control means further controls the illumination unit in response to a positive check result of the manipulation check means thereby to illuminate the display unit and key unit.

4. A portable terminal device as in claim 1, wherein: the music producing function is a karaoke function which produces both music and words of a song.

5. A portable terminal device as in claims 1, wherein the light control means limits illuminating the key unit to a predetermined time irrespective of the execution of the music producing function.

6. A portable terminal device as in claim 1, wherein the end detection means detects the end of the music based on the words of music.

7. A portable terminal device having music producing function, comprising:
- a key unit having a plurality of keys thereon;
- a display unit for displaying information in response to manipulation of the key unit;
- an illumination unit for illuminating the key unit and the display unit;
- a battery for supplying the illumination unit with electric power;
- display control means for controlling the display unit to display words of music as the information in response to output of the music during an execution of the music producing function; and
- light control means for controlling the illumination unit in a predetermined mode, so that the illumination unit illuminates the display unit during a period in which the music is produced and stops illuminating the display unit when the music stops.

* * * * *